Patented Nov. 23, 1926.

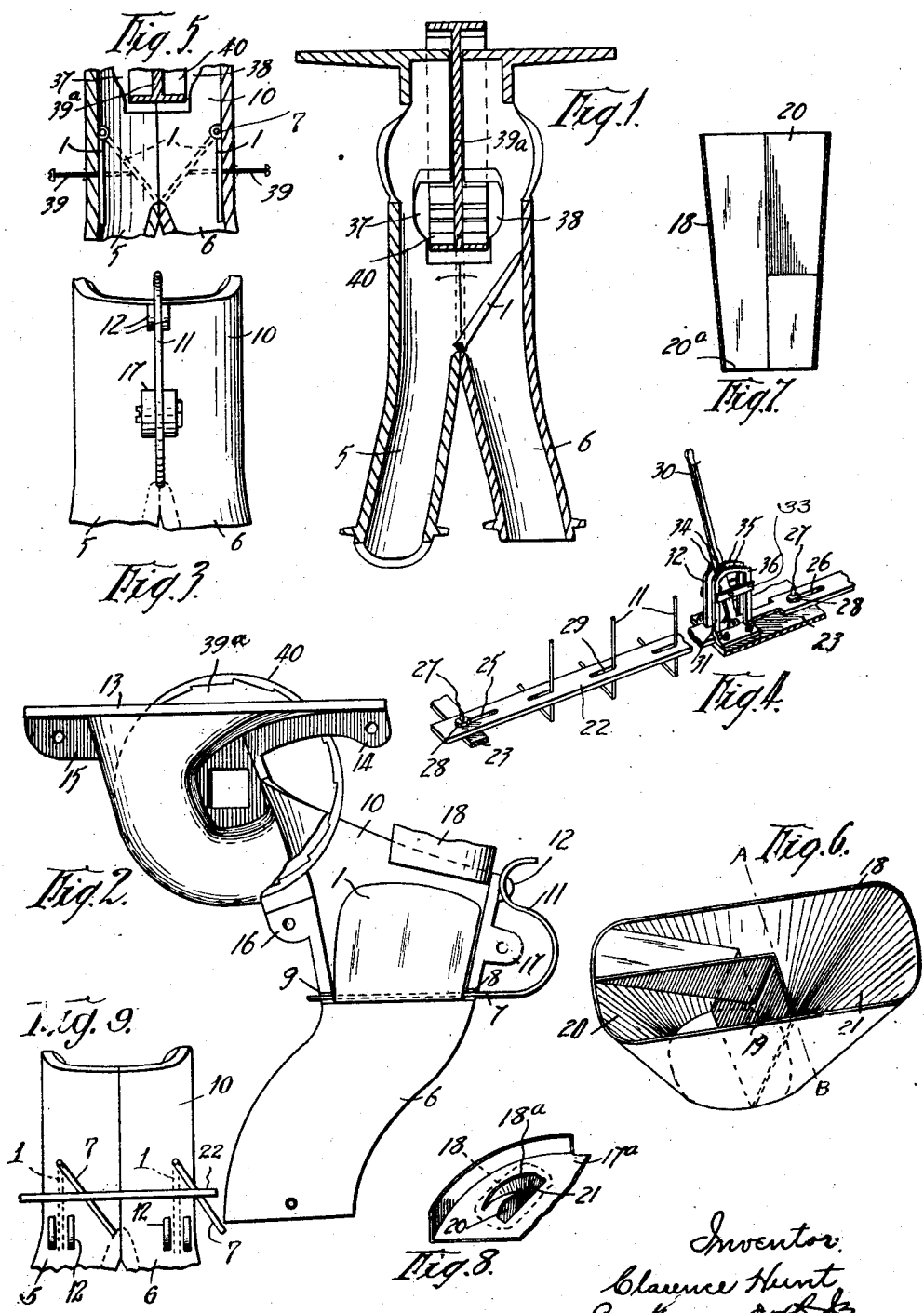

1,607,892

UNITED STATES PATENT OFFICE.

CLARENCE HUNT, OF MELBOURNE, VICTORIA, AUSTRALIA.

FEED CONTROLLER FOR MULTIPLE DRILLS.

Application filed July 20, 1925, Serial No. 44,910, and in Australia July 30, 1924.

This invention has been devised to provide improved means for adjusting the direction of flow of the fertilizer or seed or both together in seed drills and the like machines and is particularly useful for that type of machine known as a two-way or branch feed, and will be described herein in reference thereto, but the use of the invention is not limited thereto, as it may be employed in a machine of the class set forth, wherever it is desired to adjust the direction of flow of the fertilizer, grain or other seed.

With the type of machine above referred to, provision is not made to adjust the flow or feed to distribute same from any desired number of conducting tubes.

The object of this invention is to meet such requirement by providing means whereby the fertilizer or seed or both together is directed in a simple and expeditious manner during its flow from the feeding to the distributing point.

Another object of this invention is to provide means of the class set forth, constructed and arranged whereby the fertilizer or seed or both together is diverted to flow through one of the adjacent conducting tubes to provide the required number of distributing points i. e. at the bottom of the hoe or boot.

Another object of this invention is to provide means of the class set forth, constructed and arranged to permit the operation of the adjustment of any number of the conducting tubes to be performed simultaneously.

A further object of this invention is to provide means of the class set forth, constructed and arranged to enable it to be easily and simply installed in the present type of machines referred to without constructional alterations thereto.

In order that my invention may be the more easily understood, reference will be made to the accompanying sheet of drawings in which—

Fig. 1 is a sectional elevation of a distributing tube showing the hinged plate positioned to close one mouth of a branch or two-way conducting tubes.

Fig. 2 is a side elevation in section of apparatus illustrated in Fig. 1.

Fig. 3 is a front or end view of Fig. 2 with portion of the apparatus removed for sake of clearness.

Fig. 4 illustrates a manner of simultaneously operating a plurality of hinged plates hereinafter referred to.

Fig. 5 illustrates a manner of disposing the hinged plate hereinafter described within the distributing tube or the like.

Fig. 6 illustrates the fertilizer distributing tube showing a fixed and bent directing plate disposed therein.

Fig. 7 is section on line A—B of Fig. 6.

Fig. 8 shows the fertilizer feed opening over which the usual feed wheel rotates and Fig. 9 is a partial front view showing a modification.

In the accompanying drawings 1 is a hinged plate disposed centrally above the mouths of conducting tubes 5 and 6 which lead the seed and fertilizer or in some instances seed only to the one discharging point i. e. the boot adjacent to the bottom of the tynes (not shown). The plate 1 is fixed to a shaft 7 operating in front and rear bearings 8 and 9 provided in the walls of the distributing tube 10 and in alignment with the top and joint of the two inner walls of tubes 5 and 6. The front projecting portion 11 of the shaft 7 is bent vertically and is also curved to provide a spring effect at its top portion which is sprung between the two lugs 12 of the tube 10 when a clear passage to the tubes 5 and 6 is required i. e. the plate 1 is positioned vertical and held stationary, and is shaped so that when employed for closing purposes its top will neatly fit against the interior surface of the distributing tube 10 and prevent entry of seed or fertilizer or both into the respective conducting tube, this also functioning as a director plate.

It is preferred to cast or form the grain box 13, distributing tube 10 and conducting tubes 5 and 6 integral and in two halves or sections fixed together by screws passing through the lugs 14, 15, 16 and 17, this construction enables simple and easy removal and replacement of the plate 1 when required.

The fertilizer distributing tube 18 is disposed under the fertilizer box 17ª shown in section in Fig. 8 to lead the fertilizer from the feed opening 18ª therein and discharge it when required into the branched or two-way conducting tubes 5 and 6. This is accomplished by having a director plate 19 disposed within the tube 18 and whose top portion is bent to form two separate conducting tubes 20 and 21 (see Fig. 6). The position of top of such tubes depends upon the position and shape of the feed opening from the fertilizer box. The dividing line 20ª at the discharge end of 18 is preferably in alignment with the hinged plate 1. This means that each tube 20 and 21 is so-to-speak continuous, each feeding one of the tubes 5 and 6 of a branch or two-way conducting tube construction.

The shape of the opening 18ª and formation of the top portion of the plate 19 enables as the feed wheel (not shown) rotates, about equal proportions of the fertilizer to be received into each of the tubes 20 and 21.

If it is desired a plurality of plates 1 may be operated simultaneously by sliding a bar 22 supported by brackets 23 fixed to the machine at convenient points, the bar 22 being maintained in the correct plane for movement by longitudinal slots 25 and 26, through each of which a bolt 27 with nut 28 is passed. The part 11 of each shaft in this instance would be straight and will operate in the respective longitudinal slot 29 provided in the bar 22. The actuating means for the latter will comprise a suitable lever handle 30 whose lower end is hinged to the surface of the bar 22 and works between two vertical brackets 31 and 32, being hinged to the bar 33 and at each side of the handle 30 pawls 34 are placed, each engaging the teeth 35 of the respective quadrant 36 at the top of the vertical brackets 31 and 32.

Referring to Figure 5 of the drawings, this figure illustrates two hinged plates 1 disposed within the distributing tube or the like 10, each is hinged at the one side thereof and the closing operation is performed by the aid of a screw bolt 39 in contact with the respective hinged plate and working in a threaded hole in the wall of 10.

It is obvious that each of the hinged plates 1 shown in Figure 5 may be operated by the sliding bar 22 aforesaid. To enable this to be performed, each shaft 7 would project at the front of 10 at each side as shown in Figure 9. Two bars 22 one of which is shown would be employed, and each would operate independently of the other so that both hinged plates 1 could close the mouths of the tubes at the same time, or the mouth of one of said tubes may be open and the other closed. If the spring portion 11 is to be employed with the arrangement of hinged plates 1 illustrated in Figure 5, the lugs 12 would be placed at each side of 10 as shown in Figure 9 of the drawings.

In operation assuming the plate 1 is in the open position shown in dotted lines Fig. 1, the portion 11 of the shaft 7 will be held between the lugs 12 to allow the seed to fall from each of the openings 37 and 38 of the same dimensions in approximately equal proportions by reason of the central web 39ª of the seed feed wheel 40. It passes down each channel of the distributing tube into the respective tube of the branch or two-way conducting tubes 5 and 6. During the feeding of the seed approximately equal proportions of the fertilizer fall down the tubes 20 and 21, and by reason of the shape of the plate 19 making dividing line 20ª in alignment with the position of the plate 1, the fertilizer in its downward flow intermingles with the seed and also passes into the respective tube of the tubes 5 and 6.

When it is desired to close one of the said tubes 5 and 6 i. e. direct the flow of seed with or without the fertilizer, the spring portion 11 of the shaft 7 is pulled out of engagement with the lugs 12, after which it is given a turn to swing the plate 1 in the required direction so that its top is in contact with the interior wall of 10 (see Fig. 1). This places the plate 1 in a position to meet the falling seed and fertilizer or seed only from their respective distribution points directing the material into the one tube of the branched or two-way tubes 5 and 6, with the result that one sowing boot of a tyne is supplied instead of two. Any number of plates 1 may be operated according to requirements. When actuating a number, simultaneously the handle 30 will be pulled back from its position shown in Fig. 4 with the result that the bar 22 is forced forwardly, being guided by the slots 25 and 26. This action has the effect of applying pressure to the top portions 11 of the shafts 7, and in doing so turns them, causing the respective plates 1 to be thrown over to close the required mouth of the tubes 5 and 6, the plates 1 being locked in their predetermined position by reason of the pawls 34 engaging the teeth 35 of the quadrants 36. When placing the plates 1 in a non-closed position the handle 30 is operated to actuate the shafts 7, and upon the plates reaching the required position the pawls 34 are allowed to engage the teeth 35 of the quadrants 36 to place and hold the plates 1 at a position according to requirements.

I claim:

1. A feeding and directing means including a feed wheel or disc adapted to feed material on both sides of the disc, a directing tube to receive the material and provided with branching or forked tubes, a deflecting plate pivoted in the directing tube adapted when turned against the side of the tube to direct material into either fork and when vertical allowing material to flow equally into each fork, the plate pivot being extended outside the tube, and means exterior of the tube to lock the pivot in position to hold the deflecting plate in position.

2. A feeding and directing means including a feed wheel or disc adapted to feed material on both sides of the disc, a directing tube to receive the material and provided with branching or forked tubes, a deflecting plate pivoted in the directing tube, at the fork adapted when turned against the side of the tube to direct the material into either fork and when vertical allowing material to flow equally into each fork, the plate pivot being extended outside the tube and provided with a crank arm, and means to receive the arm and hold the deflecting plate vertical.

3. A feeding and distributing means for grain drills, including a feed wheel having a central web, a receptacle in which the wheel is mounted and having feed openings of equal proportions on opposite sides of the web, a directing tube to receive the grain discharged through said openings provided with branched or forked tubes, an auxiliary receptable communicating with the directing tube, a distributing plate in the auxiliary receptacle forming two conducting tubes in the latter, a deflecting plate pivoted in the directing tube adapted to direct material into either fork, and means to oscillate the plate.

4. A feeding and directing means including a feed wheel or disc adapted to feed material on both sides of the disc, a directing tube to receive the material and provided with branching or forked tubes, a deflecting plate pivoted in the directing tube at the fork and adapted when turned against the side of the tube to direct material into either fork and when vertical, allowing material to flow equally into each fork, the plate pivot being extended outside the tube and provided with an upwardly extending curved spring arm, and spaced lugs on the exterior of the directing tube to receive the end of the spring arm and hold the deflecting plate vertical.

In testimony whereof I have signed my name to this specification.

CLARENCE HUNT.